United States Patent [19]

Giordmaine

[11] 3,961,841
[45] June 8, 1976

[54] OPTICAL PULSE POSITION MODULATOR
[76] Inventor: Joseph Anthony Giordmaine, 38 Laurel Ave., Summit, N.J. 07901
[22] Filed: Sept. 23, 1970
[21] Appl. No.: 74,569

[52] U.S. Cl. .................... 350/160 R; 350/162 R; 350/168
[51] Int. Cl. ............................................. G02f 1/16
[58] Field of Search ............... 350/150, 151, 160 R, 350/161, 162 R, 168; 250/199; 331/94.5; 332/7.51

[56] References Cited
UNITED STATES PATENTS

| | | | |
|---|---|---|---|
| 3,246,557 | 4/1966 | Mertz et al. | 350/168 X |
| 3,492,600 | 1/1970 | Zitter | 331/94.5 |

*Primary Examiner*—Ronald L. Wibert
*Assistant Examiner*—Edward S. Bauer

[57] ABSTRACT

An optical pulse position modulator is provided by a diffraction grating (or other optical spectrum resolution device) in combination with a suitable control device, such as a triangular electrooptic prism. This control device introduces a frequency dependent phase shift in the optical pulse which is proportional to the difference between the frequency of each Fourier component of the pulse and the central frequency. Thereby, upon reconstruction of the pulse by reflection back to the diffraction grating, the pulse position is shifted in time according to the controlled phase shift. Such a device has a relatively higher efficiency than conventional optical delay lines for picosecond pulses in the visible region of the spectrum, for example.

8 Claims, 1 Drawing Figure

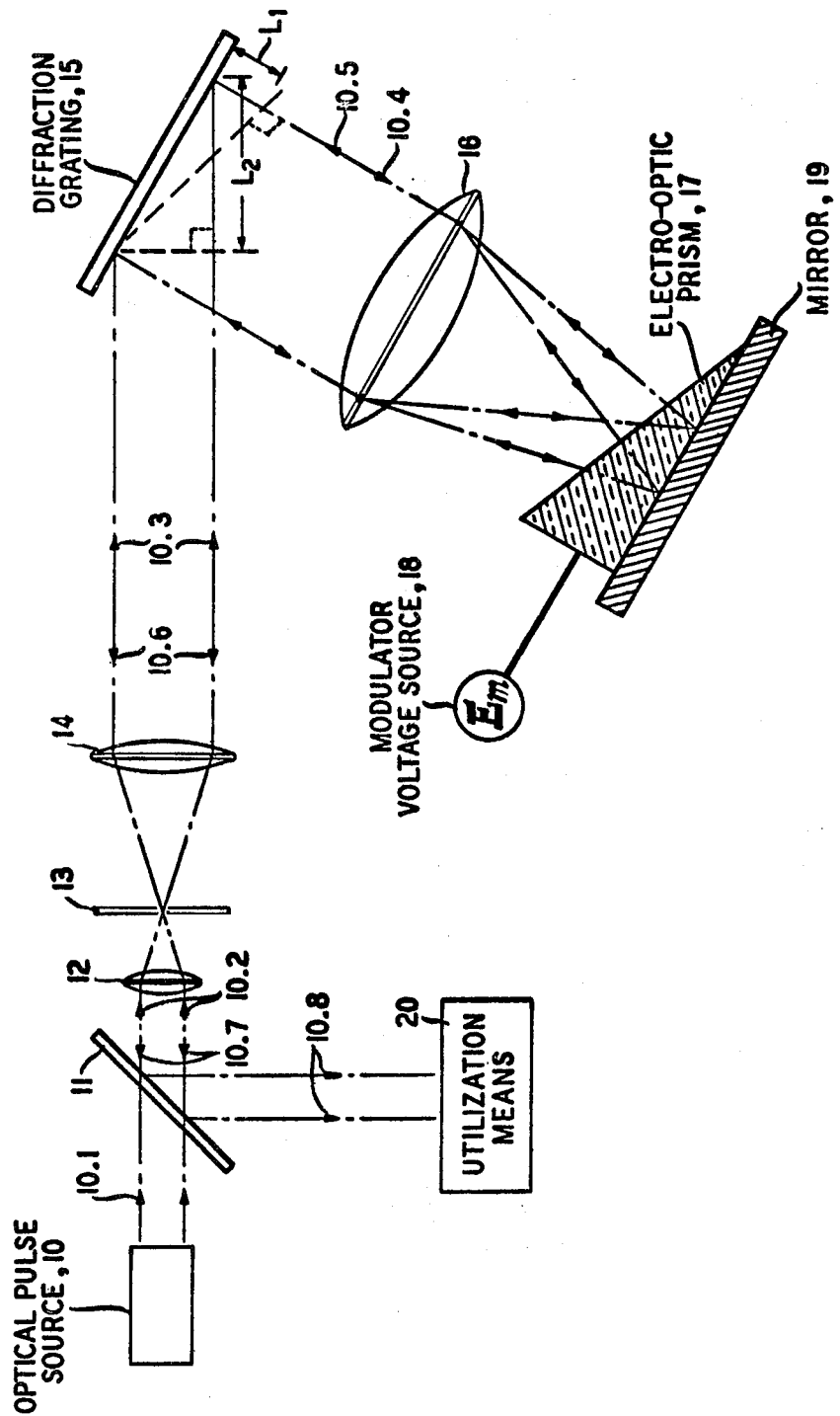

OPTICAL PULSE POSITION MODULATOR

BACKGROUND OF THE INVENTION

This invention relates to the field of optical communications systems, and more particularly to optical pulse position modulation ("PPM").

In optical communications systems, information must be impressed upon an optical transmission beam. One method of accomplishing this purpose is the controllable modulation (shift) of the relative positions in an input sequence of a stream of optical pulses; that is, different pulses in the sequence are moved forward or backward in time relative to neighboring pulses in accordance with a desired pattern of information, digital or analogue (PPM). Thus, for example, if the input stream is a sequence of equally spaced optical pulses, the output stream will be a sequence of unequally spaced optical pulses, in accordance with a desired digital or an analogue pattern. Thus, pulse position modulators of optical pulses can be used to provide the desired sequence of controllably shifted optical pulses in accordance with a desired pattern of information. A pulse position optical modulator utilizing conventional techniques would consist of an optical delay line, such as a parallel slab of transparent electrooptic material. The refractive index of this electrooptic material can be controllably varied by a voltage applied thereto, so that each of the pulses is controllably delayed upon traversing the electrooptic material in accordance with the instantaneous voltage. However, such a modulator requires an undesirably large amount of electrical power, due to the relatively large voltages required to modulate the refractive index of the electrooptic material, and hence required to modulate the position of the optical pulse traversing therethrough. Moreover, internal pulse position laser modulators, that is, modulators which are located inside the laser resonator, are limited by the rise time of the resonator, typically $10^{-11}$ sec in semiconductor lasers, whereas the duration of the laser pulse itself is typically only $10^{-12}$ sec.

SUMMARY OF THE INVENTION

This invention provides relatively higher efficiency of pulse position modulation by utilizing the known mathematical principle that if each Fourier frequency component $f$ in an input pulse wave beam is shifted in phase in a linear relationship, $A(f-f_o)$, with respect to its frequency difference from the central frequency $f_o$, then the output will be an identically shaped pulse wave beam but shifted in time position by an amount equal to the constant ($A/2\pi$) in units of time.

According to a specific embodiment of this invention, an input pulsed monochromatic optical wave beam of central frequency $f_o$ is incident upon a spectral resolution device, such as a diffraction grating. Typically, a picosecond pulse in the visible region of the spectrum constitutes the input wave beam. The outgoing wave beam in a given order of the grating spectrum is focused upon a wedge shaped electrooptic prism. The refractive index of this prism is modulated by a voltage source in accordance with the desired pattern of information to be impressed upon the optical pulsed beam. Thereby, a frequency dependent phase shift is impressed upon the optical wave, which is linearly proportional to $(f-f_o)$. After traversing this prism, the optical wave is reconstructed by another, or the same, diffraction grating into a pulsed wave beam. This last beam will be a pulsed optical beam, the time position of whose pulse is shifted in accordance with the desired pattern of information.

BRIEF DESCRIPTION OF THE DRAWING

This invention together with its objects, features, and advantages can be better understood from the following detailed description when read in conjunction with drawing in which the FIGURE is a diagram of an optical pulse position modulation system, in accordance with a specific embodiment of the invention.

DETAILED DESCRIPTION

As illustrated in the FIGURE, an optical pulse source 10, typically a laser, provides a beam 10.1 of optical radiation containing a sequence of pulses. Typically, each of the pulses is Gaussian and has a width of the order of picoseconds, the optical wavelength, $\lambda$, of the beam 10.1 being substantially monochromatic except for the spread in wavelength due to the fact that the beam is pulsed (rather than infinitely long). The pulsed beam 10.1 is incident upon a semisilvered plate 11, serving as a beam splitter. A pulse beam 10.2 is thereby formed which is collimated by a lens 12, a slit 13, and another lens 14 in order to form a collimated pulsed optical beam 10.3. This beam 10.3 is incident upon a diffraction grating 15, which directs (angularly disperses) the various Fourier frequency components of the pulsed beam 10.3 into slightly different directions determined by the well-known diffraction grating equation, $n\lambda = d(\sin\theta_1 + \sin\theta_2)$. In this equation $\theta_1$ and $\theta_2$ are the angles of incidence and diffraction respectively. Thereby, a spectrally resolved optical beam 10.4 is formed corresponding to a convenient order $n$ of the spectrum of diffraction grating 15. Advantageously, the grating 15 is designed and oriented such that the optical path difference ($L_1 + L_2$) between the two rays at the opposite edges of the beam 10.4 is at least an order of magnitude larger than the mathematical product $ct$, where $c$ is equal to the speed of light and $t$ is equal to the pulse-width measured in time. Typically, this is satisfied by a grating whose length is at least about 1 cm. The spectrally resolved beam 10.4 is incident upon a lens 16 which focuses this beam onto a mirror 19 in the focal plane of the lens 16. An electrooptic wedge-shaped prism medium 17, transparent at the optical wavelengths of interest, is located in front of the mirror 19, so that the beam 10.4 traverses the prism 17, just before and just after reflection by the mirror 19. The refractive index of the electrooptic prism 17 is controlled by an electric field supplied by a modulator voltage source 18, which is applied to a pair of electrodes (not shown) located on either side of the prism 17; thereby the refractive index of the entire prism 17 is controllably modulated in accordance with the desired pulse position modulation. Typically, the prism 17 is an electrooptic crystal such as lithium niobate or lithium tantalate, with a base of several mm. Advantageously, the amplitude of the voltage supplied by the source 18 does not vary significantly during a time period of at least ($L_1 + L_2$)/$c$. Moreover, the position of the prism 17 is advantageously located such that the ray corresponding to the central frequency $f_o$ in the pulsed beam 10.2 traverses the prism 17 at least approximately at its midpoint. Thereby, the prism 17 introduces a relative phase delay $\Phi$ in each of the Fourier components of frequency $f$ in the beam 10.4 given by $\Phi = A(f-f_o)$, where $A$ contains a constant component depending upon the dispersive powers of the grating 15 and the voltage applied to the prism 17. It should be understood that while advantageously A is substantially a constant for any particular pulse, nevertheless the value of A changes from pulse to pulse, in order to provide the desired pattern of pulse position modulation in accordance with the time variation of voltages applied to the prism 17 by the source 18. After traversing the prism 17 and the lens 16 back and forth, an optical beam 10.5 is formed which is incident again upon the grating 15. Thereupon, the grating 15 undoes the angular dispersion and a pulsed beam 10.6 is reconstructed which is characterized by the same sequence of pulses as the pulsed beam 10.1, except that each pulse in the beam 10.6 is shifted in time by an amount $A/2\pi$. Thus, the beam 10.6 is a pulse position modulated beam. After traversing the lens 14, the aperture in the slit 13 and the lens 12, the beam 10.6 becomes a pulse position modulated beam 10.7 which is incident upon the semisilvered mirror 11. Then, an exit beam 10.8 is formed (having the same pulse position modulation as the beam 10.6) which is incident upon means 20 for utilizing this beam 10.8.

It should be understood that the modulator voltage source 18 is represented in the FIGURE only symbolically, but in practice can take the form of a microwave generator of electric fields which are applied to the electrooptic prism 17 in a microwave cavity. Likewise, although the pulse has been described as Gaussian, any pulse form can be used.

In order to appreciate the efficiency of the pulse position modulation in this invention, consider that the thickest portion of the prism 17 introduces a maximum time dependent phase shift $\Phi_m$ given by $\Phi_m = A(f_m - f_o)$, where $f_m$ is the maximum frequency Fourier component in the beam 10.4 which is incident upon the prism 17. The power spectrum half width is of the same order of magnitude as $(1/t)$, the reciprocal of the pulse width. Thus, the maximum relative phase shift $\Phi_m$ introduced by the prism 17 is advantageously made equal to the order of $A/t$, by appropriate selection of both the electrooptic material in this prism and the length of its base. The pulse position delay $T_1$ is equal to $A/2\pi$, in accordance with the known mathematical principle that a phase delay equal to $A(f-f_o)$ in the Fourier spectrum of a pulse introduces a time delay equal to $A/2\pi$. Thus:

$$\Phi_m \sim A/t; \text{ and} \qquad (1)$$

$$T_1 = A/2\pi \sim \Phi_m t/2\pi. \qquad (2)$$

For conventional pulse position modulation of an optical beam by means of delay line which introduces the same phase shift $\Phi_m$, the relative time delay $T_2$ is given by:

$$T_2 = \lambda \Phi_m / 2\pi c \qquad (3)$$

where $c$ is the speed of light. Thus, the relative efficiency of this invention as compared with a conventional delay line is given by:

$$(T_1/T_2) \sim (ct/\lambda). \qquad (4)$$

As a particular example, for a 10 picosecond pulsewidth ($t = 10^{-11}$ sec) and for a laser source 10 which supplies a beam 10.1 having a wavelength of 6943 A, the relative efficiency is thus given by:

$$(T_1/T_2) \sim 5,000. \qquad (5)$$

Although this invention has been described in detail in terms of a specific embodiment, many and diverse modifications can be made by the worker of ordinary skill in the art without departing from the scope of the invention. For example, the prism 17 can be rectangularly shaped in conjunction with an applied voltage linearly varying in a direction in the plane of the drawing parallel to the surface of the mirror 19, that is, a constant voltage gradient in said direction; in order to produce a linearly varying refractive index in said direction, and hence the desired linearly varying phase delay, $\Phi = A(f-f_o)$. Moreover, the triangular shaped prism 17 can be omitted whereas the angular orientation of the mirror 18 with respect to the direction of propagation of the beam 10.4 is modulated in time according to the desired pulse delays (pattern of information) to be impressed thereon.

What is claimed is:
1. A pulse position modulation system which comprises:
   a. first means for producing an angular dispersion of the Fourier frequency components in an optical pulse beam;
   b. second means for producing a controllable phase shift in said components, which is proportional to the difference in frequency between each of the components and the central frequency of the pulse beam;
   c. third means for undoing the angular dispersion after the beam has traversed the second means, in order to form an output pulse beam whose position is shifted in accordance with the controllable phase shift.

2. The system recited in claim 1 in which the first and the third means are provided by a single device, and which further includes fourth means for directing the beam upon the device after the beam has traversed the second means.

3. The system recited in claim 2 in which the device is a diffraction grating.

4. The system recited in claim 1 in which the phase shift is linearly proportional to said difference in frequency.

5. The system recited in claim 4 in which the second means is a wedge shaped transparent medium whose refractive index with respect to said components can be modulated.

6. The system recited in claim 5 in which the transparent medium is electrooptic.

7. The system recited in claim 6 which further includes voltage means for controllably varying the said refractive index of the medium.

8. The system recited in claim 7 which further includes a source of the optical pulse beam and fifth means for utilizing the beam after interaction with the third means.

* * * * *

UNITED STATES PATENT AND TRADEMARK OFFICE
CERTIFICATE OF CORRECTION

PATENT NO. : 3,961,841
DATED : June 8, 1976
INVENTOR(S) : Joseph Anthony Giordmaine It is certified that error appears in the above-identified patent and that said Letters Patent are hereby corrected as shown below:

On Abstract page, delete street address of inventor, that is, "38 Laurel Ave."

Before "Filed: Sept. 23, 1970" insert
--Assignee: Bell Telephone Laboratories, Incorporated
           Murray Hill, N. J.--.

After "Assistant Examiner-Edward S. Bauer", insert
--Attorney, Agent, or Firm--D. I. Caplan--.

Signed and Sealed this

Twenty-third Day of November 1976

[SEAL]

Attest:

RUTH C. MASON
*Attesting Officer*

C. MARSHALL DANN
*Commissioner of Patents and Trademarks*